United States Patent [19]
Mouri

[11] Patent Number: 5,712,727
[45] Date of Patent: Jan. 27, 1998

[54] REAL-IMAGE ZOOM FINDER

[75] Inventor: Motohisa Mouri, Yokohama, Japan

[73] Assignee: Nikon Corporation, Tokyo, Japan

[21] Appl. No.: 610,863

[22] Filed: Mar. 5, 1996

[30] Foreign Application Priority Data

Mar. 8, 1995 [JP] Japan ................................. 7-077327

[51] Int. Cl.$^6$ ........................... G02B 23/00; G02B 15/14
[52] U.S. Cl. ......................... 359/431; 359/422; 359/432; 359/686
[58] Field of Search ........................... 359/362, 420–422, 359/431–433, 676, 677, 686; 396/373–386

[56] References Cited

U.S. PATENT DOCUMENTS

| | | | |
|---|---|---|---|
| 4,846,562 | 7/1989 | Tokumaru et al. | 359/686 |
| 5,091,739 | 2/1992 | Kawamura | 396/384 |
| 5,173,806 | 12/1992 | Ogata | 359/686 |
| 5,191,477 | 3/1993 | Abe et al. | 359/695 |
| 5,235,460 | 8/1993 | Abe | 359/432 |
| 5,323,264 | 6/1994 | Kato | 359/432 |

FOREIGN PATENT DOCUMENTS 611976  8/1994  Japan ................................. 359/432

*Primary Examiner*—Thong Nguyen
*Attorney, Agent, or Firm*—Shapiro and Shapiro

[57] ABSTRACT

A real-image zoom finder has an objective lens having a positive refractive power, and an eyepiece lens which is used for observing a real image of an object formed via the objective lens and has a positive refractive power. The objective lens includes, in the order from the object side, a first lens unit having a negative refractive power, a second lens unit having a positive refractive power, a third lens unit having a negative refractive power, and a fourth lens unit having a positive refractive power, and attains zooming by moving at least the second lens unit along the optical axis. The objective lens satisfies the following conditions:

$$-0.6 < (R2+R1)/(R2-R1) < 0$$

$$0.3 < |f3|/fT < 0.7$$

where R1 is the radius of curvature of the object-side surface of a negative lens component closest to the object side in the third lens unit, R2 is the radius of curvature of the image-side surface of the negative lens component, f3 is the focal length of the third lens unit, and fT is the longest focal length of the objective lens.

18 Claims, 9 Drawing Sheets

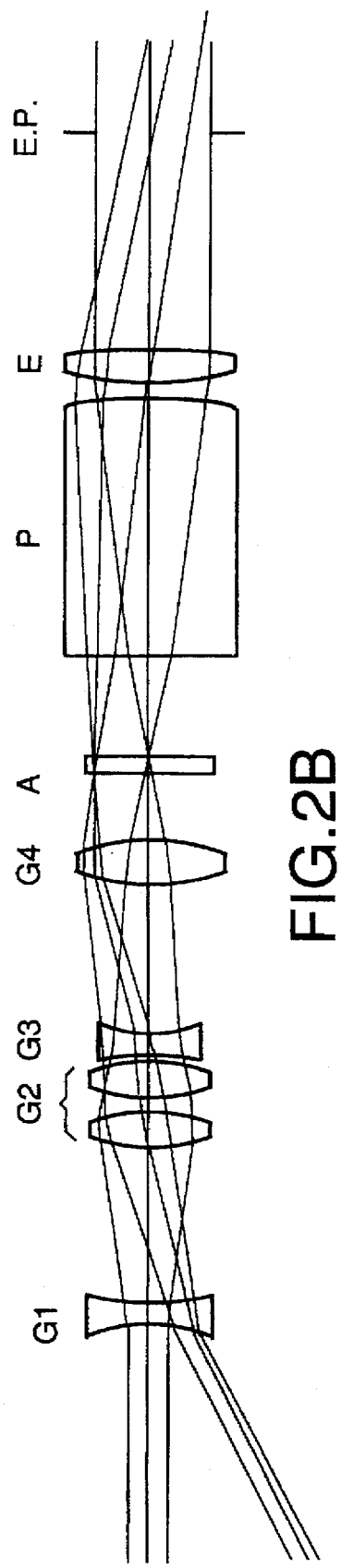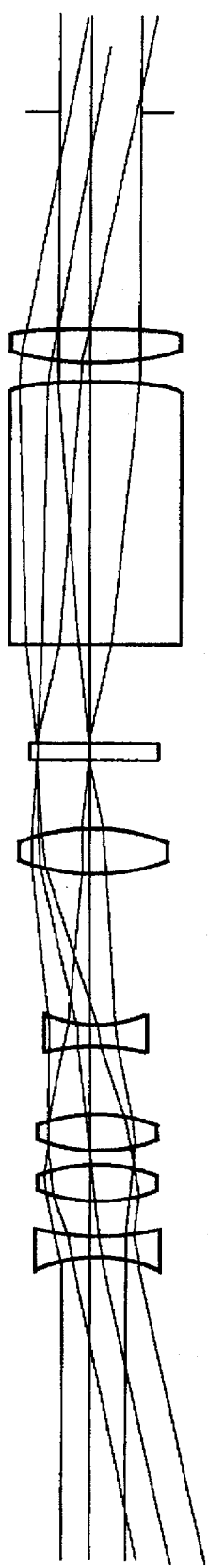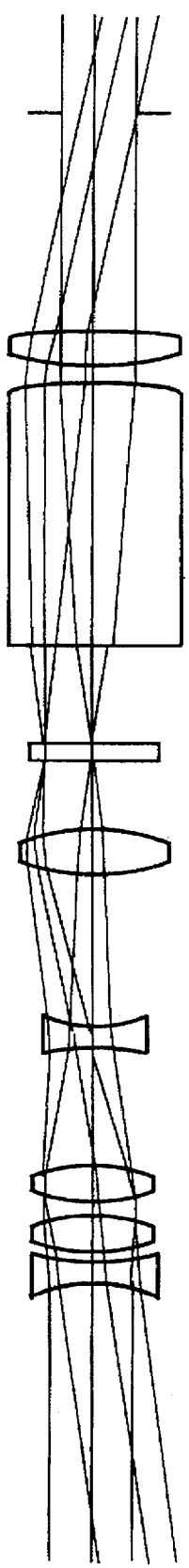

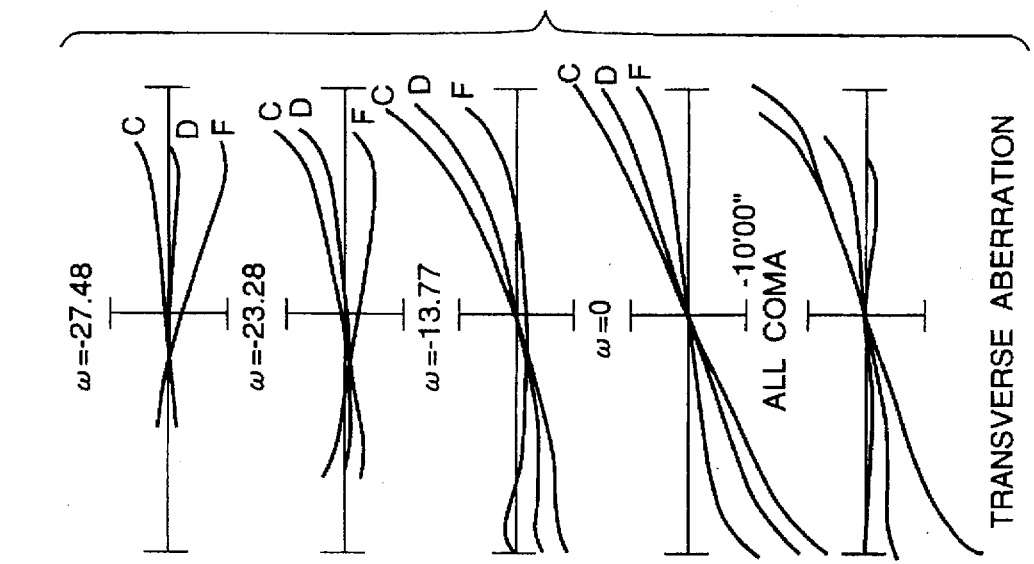

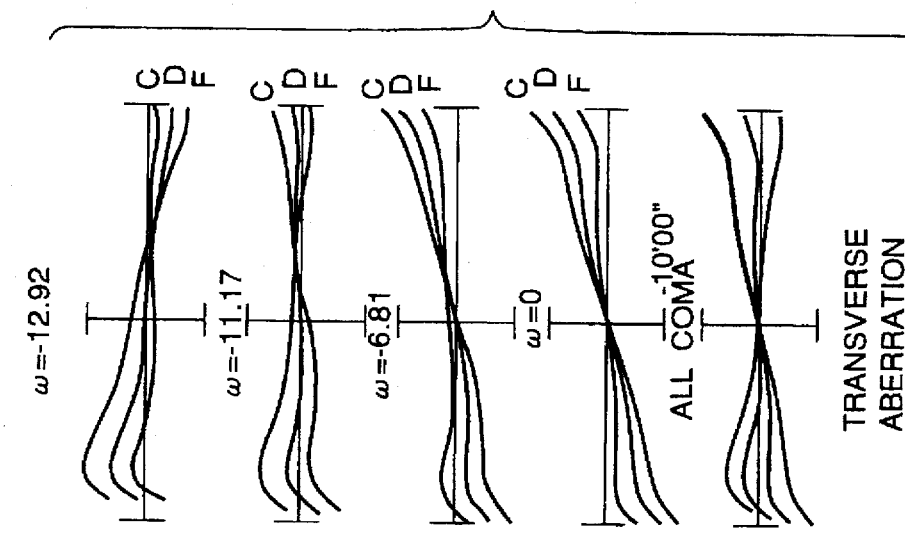
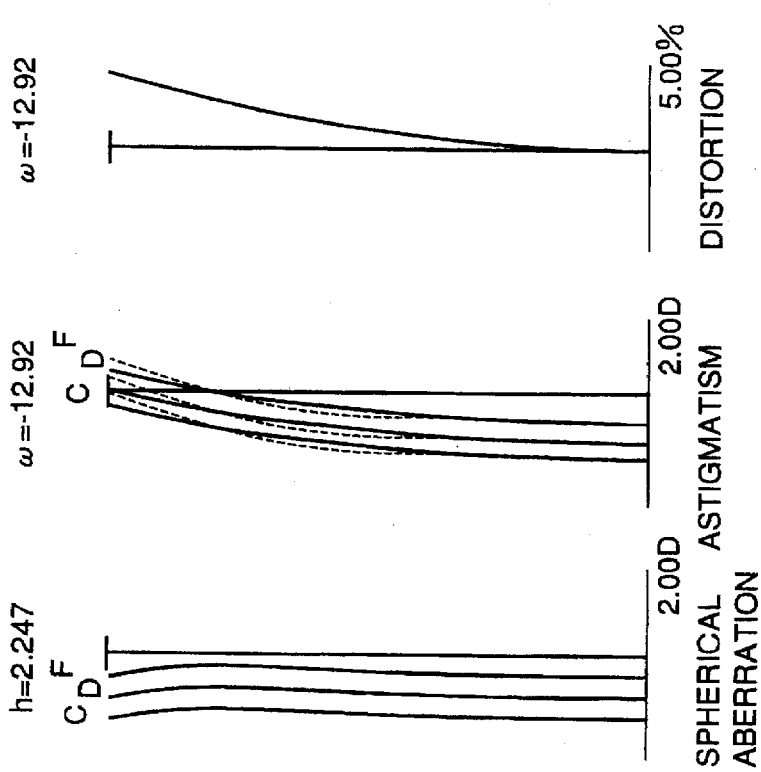

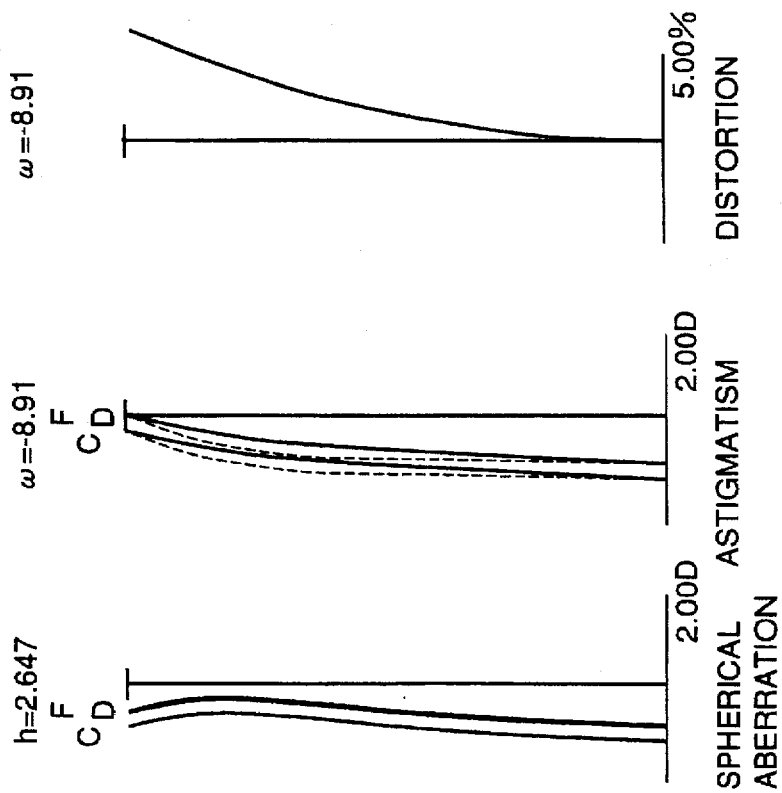
FIG.5A SPHERICAL ABERRATION
FIG.5B ASTIGMATISM
FIG.5C DISTORTION
FIG.5D CHROMATIC ABERRATION OF MAGNIFICATION
FIG.5E TRANSVERSE ABERRATION

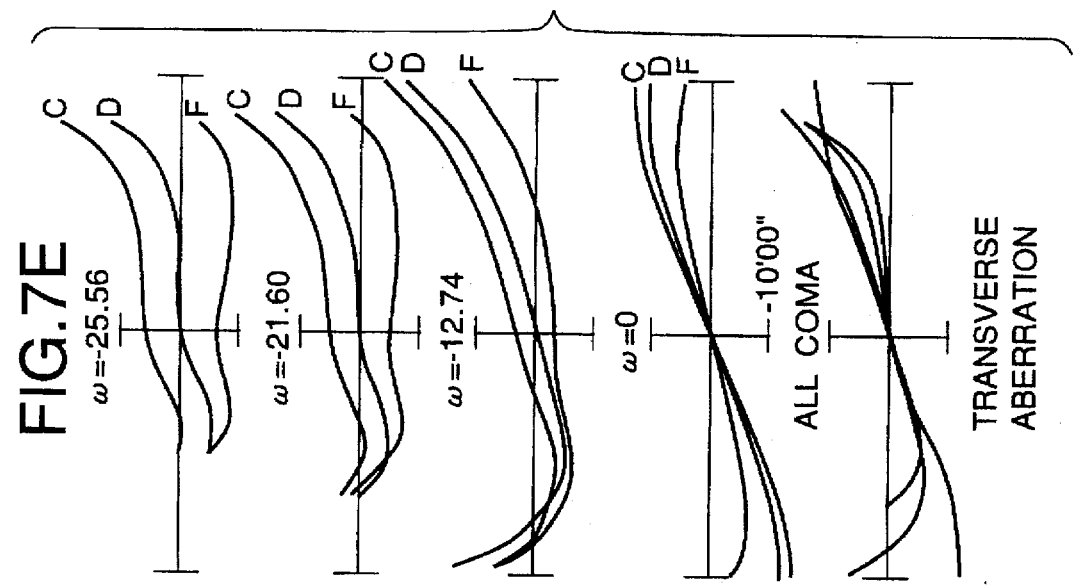
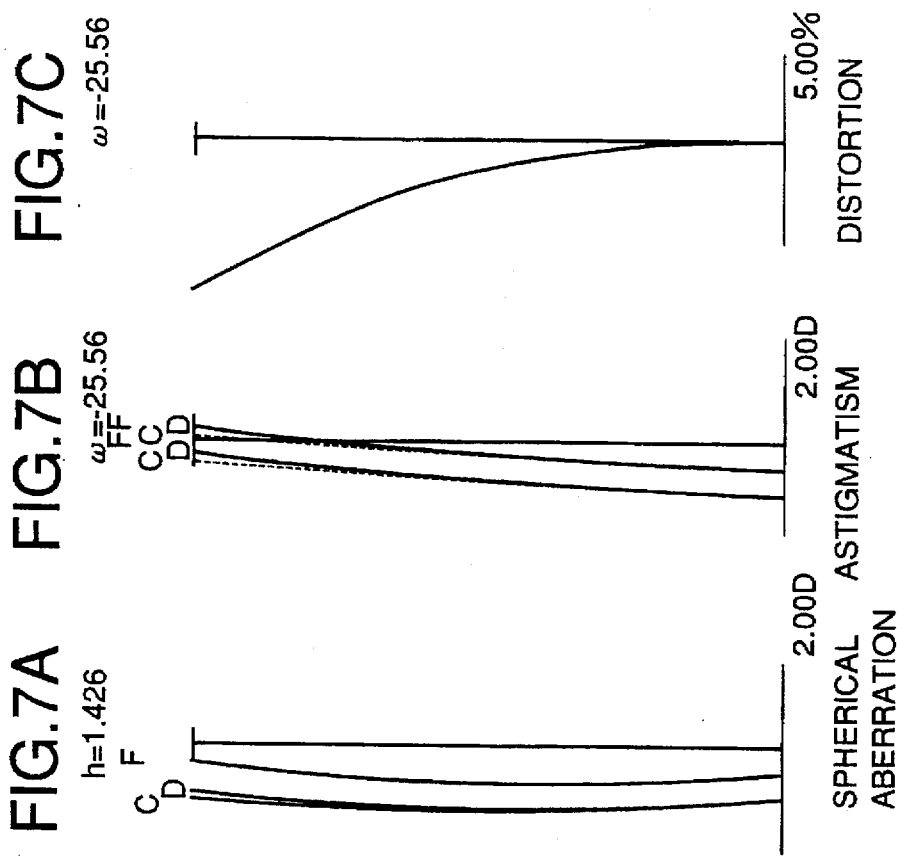

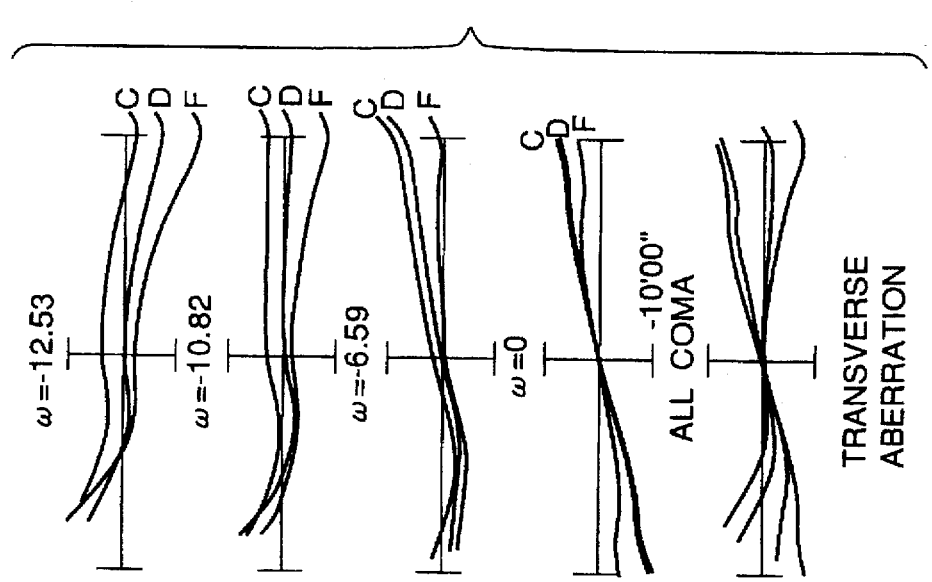

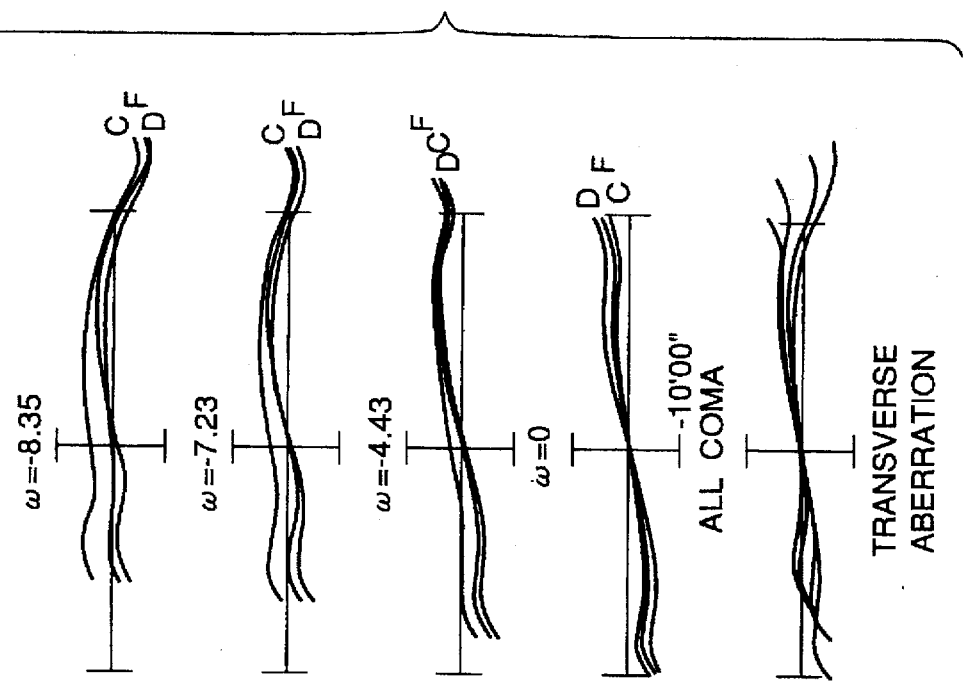

REAL-IMAGE ZOOM FINDER

BACKGROUND OF THE INVENTION

1. Field of the Invention

The present invention relates to a real-image zoom finder and, more particularly, to a real-image zoom finder used in, e.g., a compact camera.

2. Related Background Art

In a conventional real-image zoom finder, a field frame is arranged at the position of a real image of an object, which is formed via an objective lens, thus providing a clear field of view to an observer on the eyepoint. Therefore, the real-image zoom finder is popularly used in an optical product such as the zoom finder of a compact camera.

However, when a high zoom ratio of x2.5 or higher is to be assured in the conventional real-image zoom finder, the optical system becomes bulky and an observation image with high quality cannot be obtained.

SUMMARY OF THE INVENTION

The present invention has been made in consideration of the above situation, and has as its object to provide a compact real-image zoom finder, which has a high zoom ratio and can assure a wide observation field of view.

In order to achieve the above object, according to the present invention, in a real-image zoom finder, which comprises an objective lens having a positive refractive power and an eyepiece lens which is used for observing a real image of an object formed via the objective lens and has a positive refractive power, the objective lens comprises, in the order from the object side, a first lens unit having a negative refractive power, a second lens unit having a positive refractive power, a third lens unit having a negative refractive power, and a fourth lens unit having a positive refractive power, and attains zooming by moving at least the second lens unit along the optical axis.

The zoom finder satisfies the following conditions:

$$-0.6 < (R2+R1)/(R2-R1) < 0$$

$$0.3 < |\beta 3|/fT < 0.7$$

where R1 is the radius of curvature of an object-side surface of a negative lens component closest to the object side in the third lens unit, R2 is the radius of curvature of an image-side surface of the negative lens component, f3 is the focal length of the third lens unit, and fT is the longest focal length of the objective lens.

According to a preferred aspect of the present invention, an image erecting means that is part of a system for converting the real image into an erected image is arranged in an optical path between the third and fourth lens units.

BRIEF DESCRIPTION OF THE DRAWINGS

FIGS. 2A to 2C are optical path diagrams of a real-image zoom finder according to a first embodiment of the present invention in low-magnification, middle-magnification, and high-magnification states;

FIGS. 3A to 3E are graphs showing various aberrations in a low-magnification state in the first embodiment;

FIGS. 4A to 4E are graphs showing various aberrations in a middle-magnification state in the first embodiment;

FIGS. 5A to 5E are graphs showing various aberrations in a high-magnification state in the first embodiment;

FIGS. 7A to 7E are graphs showing various aberrations in a low-magnification state in the second embodiment;

FIGS. 8A to 8E are graphs showing various aberrations in a middle-magnification state in the second embodiment; and FIGS. 9A to 9E are graphs showing various aberrations in a high-magnification state in the second embodiment.

DETAILED DESCRIPTION OF THE PREFERRED EMBODIMENTS

Figure 1B:
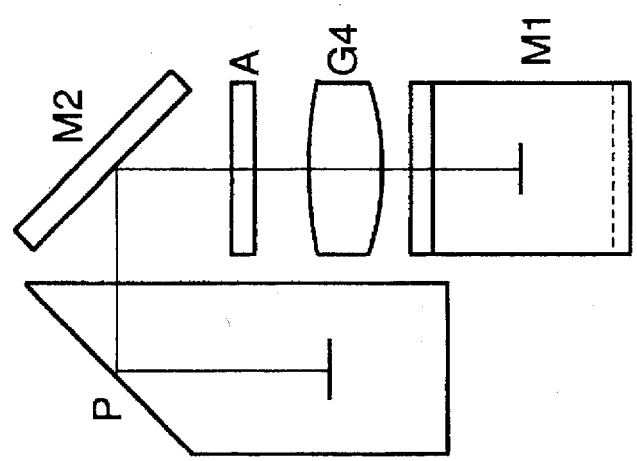
FIGS. 1A and 1B are schematic views showing the arrangement of a real-image zoom finder according to the respective embodiments of the present invention.

The preferred embodiments of the present invention will be described below with reference to the accompanying drawings.

In a real-image zoom finder of the present invention, an objective lens unit comprises a first lens unit having a negative refractive power, a second lens unit having a positive refractive power, a third lens unit having a negative refractive power, and a fourth lens unit having a positive refractive power, and a real image is formed in the neighborhood of the fourth lens unit. The zoom finder attains zooming by moving at least the second lens unit along the optical axis.

In order to broaden the zoom range in the above arrangement of the objective lens, the moving amount of the second lens unit for zooming or the positive refractive power of the second lens unit must be increased. However, when the moving amount of the second lens unit for zooming is increased, the size of the objective lens becomes large, thus disturbing a size reduction of a finder optical system as one object of the present invention.

In view of this problem, the present invention aims at achieving a size reduction of the optical system while attaining a high zoom ratio by increasing the positive refractive power of the second lens unit. In order to attain a further size reduction, the third lens unit having a negative refractive power is arranged behind (on the eyepoint side of) the second lens unit. With this arrangement, a light beam converged by the second lens unit having a positive refractive power is diverged by the third lens unit having a negative refractive power, thereby assuring a predetermined air gap between the third and fourth lens units. Therefore, as an image erecting means (a device) that is part of a system for converting a real image into an erect image, a reflection mirror can be inserted in the optical path between the third and fourth lens units.

By inserting the image erecting means in the objective lens, the finder optical path is integrated, and a size reduction of the entire finder optical system can be easily realized. In particular, the total length from the objective lens to the eyepoint can be shortened.

Conditional formulas of the present invention will be explained below.

The real-image zoom finder of the present invention satisfies conditional formulas (1) and (2) below:

$$-0.6 < (R2+R1)/(R2-R1) < 0 \qquad (1)$$

$$0.3 < |\beta 3|/fT < 0.7 \qquad (2)$$

where

R1: the radius of curvature of an object-side surface of a negative lens component closest to the object side in the third lens unit R2: the radius of curvature of an image-side surface of the negative lens component closest to the object side in the third lens unit f3: the focal length of the third lens unit fT: the longest focal length of the objective lens Conditional formula (1) defines an appropriate range for the shape factor $(R2+R1)/(R2-R1)$ of the negative lens component closest to the object side in the third lens unit of the objective lens. Conditional formula (1) is one for maintaining a satisfactory aberration state upon zooming, and is particularly effective for correcting coma.

When the shape factor exceeds the upper limit value of conditional formula (1), negative coma tends to be generated undesirably in a real image formed via the objective lens.

Contrary to this, when the shape factor is smaller than the lower limit value of conditional formula (1), positive coma is generated undesirably in a real image.

Conditional formula (2) defines an appropriate range for the ratio between the focal length of the third lens unit and the longest focal length of the objective lens. Conditional formula (2) is one for balancing between easy insertion of the image erecting means between the third and fourth lens units, and a size reduction of the finder optical system.

When the ratio exceeds the upper limit value of conditional formula (2), the gap between the third and fourth lens units becomes too small, making it difficult to insert the image erecting means.

On the other hand, when the ratio is smaller than the lower limit value of conditional formula (2), the gap between the third and fourth lens units becomes large and the image erecting means can be easily inserted. However, such small ratio is not preferable for the following reason. That is, when the gap between the third and fourth lens units becomes large, a light beam is diverged by the third lens unit having a negative refractive power and the beam spot size becomes large, thus disturbing a size reduction of the finder optical system.

In the present invention, in order to obtain higher optical performance, it is preferable to use aspherical surfaces in the respective lens units. In particular, when aspherical surfaces are used in the first and second lens units of the objective lens, a variation in coma upon zooming can be satisfactorily corrected.

Figure 1A:
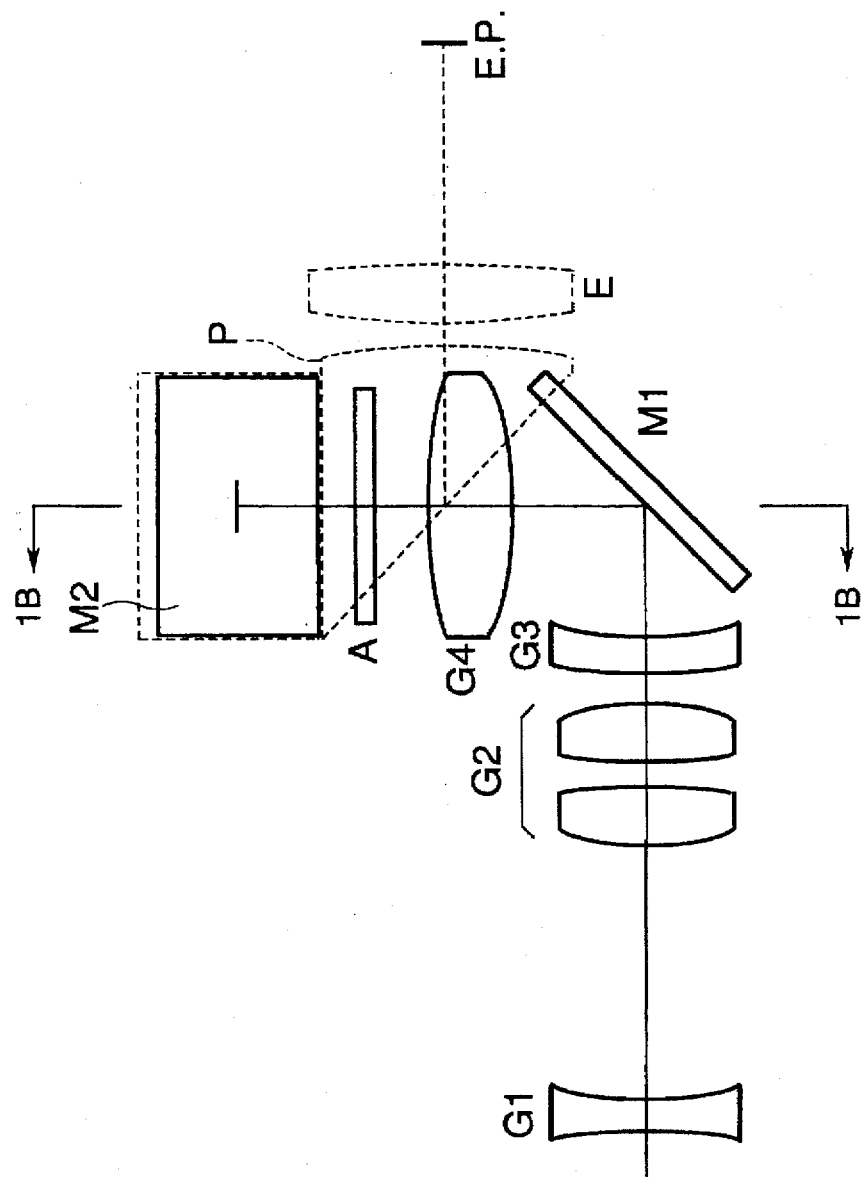

FIGS. 1A and 1B are schematic views showing the arrangement of a real-image zoom finder according to the respective embodiments of the present invention. Note that FIG. 1B is a sectional view taken along a line 1B—1B of FIG. 1A.

As shown in FIGS. 1A and 1B, the real-image zoom finder of this embodiment comprises an objective lens, which consists of, in the order from the object side, a first lens unit G1 of a negative refractive power, a second lens unit G2 of a positive refractive power, a third lens unit G3 of a negative refractive power, and a fourth lens unit G4 of a positive refractive power. Note that a first reflection mirror M1 serving as an image erecting means is inserted between the third and fourth lens units G3 and G4.

A field frame A is arranged near the focal point position of the objective lens, and a real image of an object via the objective lens is formed on the object-side surface of the field frame A. Light from the real image is reflected by a second reflection mirror M2, and is then incident on a prism P having two reflection surfaces. The light reflected twice in the prism P reaches an eyepoint E.P. via an eyepiece lens E having a positive refractive power.

[First Embodiment]

FIGS. 2A to 2C are charts optical path diagram of a real-image zoom finder according to the first embodiment of the present invention. Note that FIG. 2A shows the lens layout in a low-magnification state, FIG. 2B shows the lens layout in a middle-magnification state, and FIG. 2C shows the lens layout in a high-magnification state. In FIGS. 2A to 2C, the first and second reflection mirrors M1 and M2 are not shown.

Referring to FIGS. 2A to 2C, an objective lens comprises, in the order from the object side, a first lens unit G1 consisting of a biconcave lens having an aspherical surface on the eyepoint side, a second lens unit G2 consisting of a biconvex lens having an aspherical surface on the object side and another biconvex lens, a third lens unit G3 consisting of a biconcave lens, and a fourth lens unit G4 consisting of a biconvex lens having an aspherical surface on the object side.

Note that the image position of the objective lens corresponds to the object-side surface of a field frame A. The exit surface of a prism P is formed to have a convex surface facing the eyepoint side, and shares the role of an eyepiece lens E.

As shown in FIGS. 2A to 2C, upon zooming from low magnification to high magnification, the second lens unit G2 moves toward the object side. Upon zooming from low magnification to high magnification, when the first lens unit G1 moves along a curved path with a concave surface facing the object side, a constant finder diopter is maintained upon zooming.

Table 1 below summarizes the data values of the first embodiment of the present invention. In Table 1, m is the finder magnification, D is the diopter, $2\omega$ is the field angle, and EP is the eyepoint. Also, numeral i in the leftmost column indicates the order of lens surfaces from the object side, r is the radius of curvature of each lens surface, d is the lens surface interval, and n and $\nu$ are respectively the refractive index and Abbe's number for the d-line ($\lambda$=587.6 nm).

In the respective embodiments, the shape of an aspherical surface is given by formula (a) below:

$$S(y) = (y^2/R)/[1+(1-\kappa \cdot y^2/R^2)^{1/2}] + C_2 \cdot y^2 + C_4 \cdot y^4 + C_6 \cdot y^6 + C_8 \cdot y^8 + C_{10} \cdot y^{10} + \ldots \quad (a)$$

where y is the height in a direction perpendicular to the optical axis, s(y) is the displacement amount of a surface in the optical axis direction at the height y, R is the reference radius of curvature (radius of curvature at the vertex), $\kappa$ is a constant of cone, and $C_n$ is an n-th order aspherical surface coefficient.

The paraxial radius of curvature r of an aspherical surface is defined by formula (b) below:

$$r=1/(2 \cdot C_2+1/R) \quad (b)$$

Aspherical surfaces in the data tables of the respective embodiments are indicated by marks * on the right side of their surface numbers. The imaging position of the objective lens is indicated by a mark "F" on the right side of the surface number.

TABLE 1 m = 0.380 to 1.087
D = -1.0
2ω = 54.964° to 17.828°
EP = 15
fT = 21.553
f3 = -14.410

| i | r | d | n | υ |
|---|---|---|---|---|
| 1 | -13.6993 | 1.2000 | 1.57410 | 35.10 |
| 2* | 12.7338 | (d2 = variable) | | |
| 3* | 12.4737 | 2.0000 | 1.49108 | 57.57 |
| 4 | -12.1173 | 1.0000 | | |
| 5 | 13.5975 | 2.0000 | 1.49108 | 57.57 |
| 6 | -23.6205 | (d6 = variable) | | |
| 7 | -21.0923 | 1.0000 | 1.57410 | 35.10 |
| 8 | 13.8478 | 9.5000 | | |
| 9* | 10.1884 | 3.0000 | 1.49108 | 57.57 |
| 10 | -17.0994 | 5.2200 | | |
| 11F | ∞ | 0.7000 | 1.52216 | 58.74 |
| 12 | ∞ | 7.4000 | | |
| 13 | ∞ | 16.2000 | 1.49108 | 57.57 |
| 14 | -19.9960 | 1.0000 | | |
| 15 | 24.4930 | 2.0000 | 1.49108 | 57.57 |
| 16 | -72.9211 | 15.0000 | | |
| 17 | eyepoint | | | |

(Aspherical Surface Data)

| | K | $C_2$ | $C_4$ |
|---|---|---|---|
| Second Surface | -3.7200 | 0.0000 | 0.0000 |
| | $C_6$ | $C_8$ | $C_{10}$ |
| | 0.0000 | 0.0000 | 0.0000 |
| | K | $C_2$ | $C_4$ |
| Third Surface | -5.1400 | 0.0000 | 0.0000 |
| | $C_6$ | $C_8$ | $C_{10}$ |
| | 0.0000 | -3.75 × 10 | 0.0000 |
| | K | $C_2$ | $C_4$ |
| Ninth Surface | -2.5000 | 0.0000 | 0.0000 |
| | $C_6$ | $C_8$ | $C_{10}$ |
| | 0.0000 | 0.0000 | 0.0000 |

(Variable Interval Upon Zooming)

| Magnification | 0.380 | 0.758 | 1.087 |
|---|---|---|---|
| d2 | 10.9922 | 2.8734 | 0.4039 |
| d4 | 0.5672 | 4.5229 | 7.9611 |

(Condition Corresponding Values)

(1) (R2 + R1)/(R2 - R1) = -0.207
(2) |f3|/fT = +0.668

FIGS. 3A to 3E, 4A to 4E, and 5A to 5E are graphs showing various aberrations in the first embodiment. FIGS. 3A to 3E are graphs showing various aberrations in a low-magnification state, FIGS. 4A to 4E are graphs showing various aberrations in a middle-magnification state, and FIGS. 5A to 5E are graphs showing various aberrations in a high-magnification state.

In these graphs, h is the height of incidence, ω is the half field angle, C is the C-line (λ=656.3 nm), D is the d-line (λ=587.6 nm), and F is the F-line (λ=486.1 nm).

In each graph showing astigmatism, a solid curve represents the sagittal image plane, and a broken curve represents the meridional image plane. Furthermore, in each graph showing spherical aberration, a broken curve represents the sine condition.

As can be seen from these graphs, in this embodiment, various aberrations, especially, coma, are satisfactorily corrected over the respective focal length states from low magnification to high magnification.

[Second Embodiment]

Figure 6A:
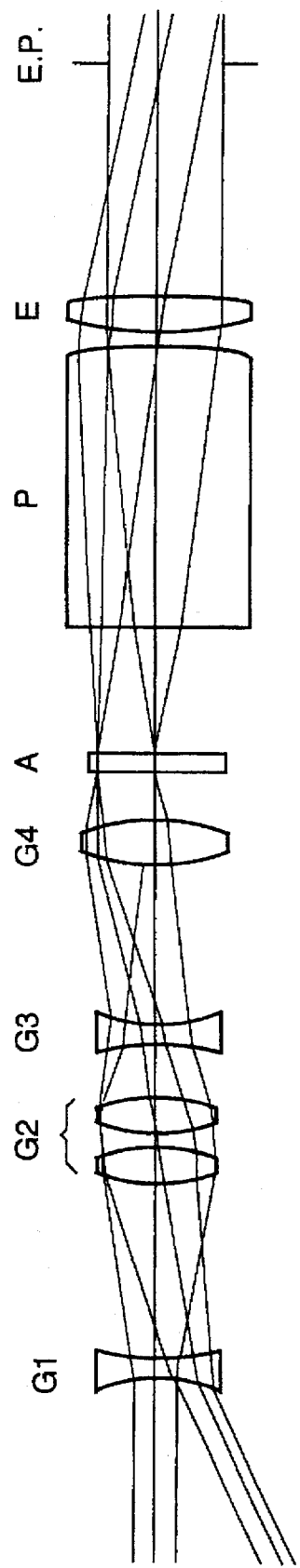
FIGS. 6A to 6C are optical path diagrams of a real-image zoom finder according to a second embodiment in low-magnification, middle-magnification, and high-magnification states.
Figure 6B:
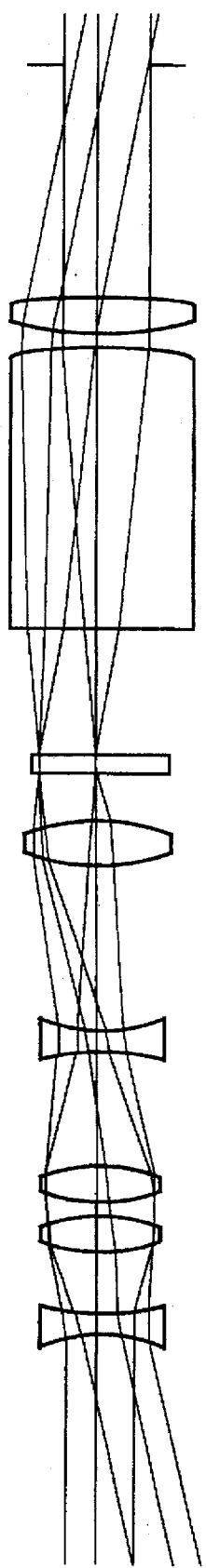
Figure 6C:
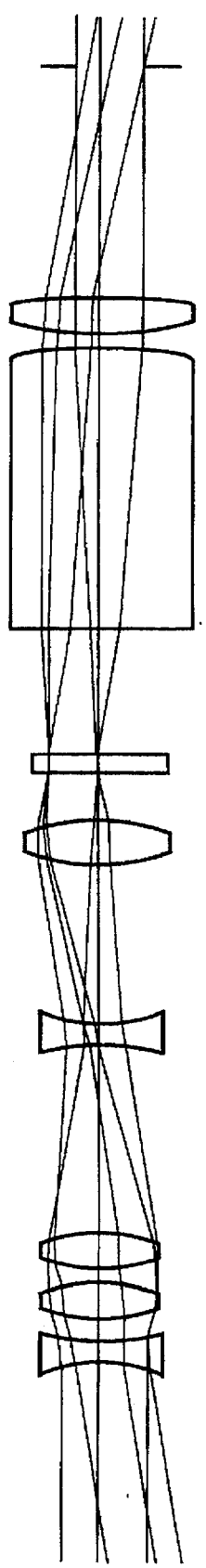

FIGS. 6A to 6C are optical path diagrams of a real-image zoom finder according to the second embodiment of the present invention. Note that FIG. 6A shows the lens layout in a low-magnification state, FIG. 6B shows the lens layout in a middle-magnification state, and FIG. 6C shows the lens layout in a high-magnification state. In FIGS. 6A to 6C, the first and second reflection mirrors M1 and M2 are not shown.

Referring to FIGS. 6A to 6C, an objective lens comprises, in the order from the object side, a first lens unit G1 consisting of a biconcave lens having an aspherical surface on the eyepoint side, a second lens unit G2 consisting of a biconvex lens having an aspherical surface on the object side and another biconvex lens, a third lens unit G3 consisting of a biconcave lens, and a fourth lens unit G4 consisting of a biconvex lens having an aspherical surface on the object side.

Note that the image position of the objective lens corresponds to the object-side surface of a field frame A. The exit surface of a prism P is formed to have a convex surface facing the eyepoint side, and shares the role of an eyepiece lens E.

As shown in FIGS. 6A to 6C, upon zooming from low magnification to high magnification, the second lens unit G2 moves toward the object side. Upon zooming from low magnification to high magnification, when the first lens unit G1 moves along a curved path with a concave surface facing the object side, a constant finder diopter is maintained upon zooming.

Table 2 below summarizes the data values of the second embodiment of the present invention. In Table 2, m is the finder magnification, D is the diopter, 2ω is the field angle, and EP is the eyepoint. Also, numeral i in the leftmost column indicates the order of lens surfaces from the object side, r is the radius of curvature of each lens surface, d is the lens surface interval, and n and ν are respectively the refractive index and Abbe's number for the d-line (λ=587.6 nm).

TABLE 2 m = 0.417 to 1.179
D = -1.0
2ω = 51.127° to 16.708°
EP = 15
fT = 23.000
f3 = -10.433

| i | r | d | n | υ |
|---|---|---|---|---|
| 1 | -8.7796 | 1.2000 | 1.58300 | 29.90 |
| 2* | 12.0723 | (d2 = variable) | | |
| 3* | 11.7052 | 2.0000 | 1.49108 | 57.57 |
| 4 | -12.1747 | 1.0000 | | |
| 5 | 20.3123 | 2.0000 | 1.49108 | 57.57 |
| 6 | -10.8520 | (d6 = variable) | | |
| 7 | -28.2070 | 1.0000 | 1.58300 | 29.90 |
| 8 | 7.8560 | 9.4000 | | |
| 9* | 11.3411 | 3.0000 | 1.49108 | 57.57 |
| 10 | -13.0400 | 2.8000 | | |
| 11F | ∞ | 0.7000 | 1.52216 | 58.74 |
| 12 | ∞ | 7.4000 | | |
| 13 | ∞ | 16.2000 | 1.52500 | 51.02 |
| 14 | -19.9960 | 1.0000 | | |
| 15 | 25.7030 | 2.0000 | 1.49108 | 57.57 |
| 16 | -71.3930 | 15.0000 | | |
| 17 | eyepoint | | | |

(Aspherical Surface Data)

| | K | $C_2$ | $C_4$ |
|---|---|---|---|
| Second Surface | -6.3700 | 0.0000 | 0.0000 |
| | $C_6$ | $C_8$ | $C_{10}$ |
| | 0.0000 | 0.0000 | 0.0000 |
| | K | $C_2$ | $C_4$ |

TABLE 2-continued

| | | | |
|---|---|---|---|
| Third Surface | -10.8800 | 0.0000 | 0.0000 |
| | $C_6$ | $C_8$ | $C_{10}$ |
| | 0.0000 | $-1.24 \times 10$ | $4.63 \times 10$ |
| | K | $C_2$ | $C_4$ |
| Ninth Surface | -2.5000 | 0.0000 | 0.0000 |
| | $C_6$ | $C_8$ | $C_{10}$ |
| | 0.0000 | 0.0000 | 0.0000 |

(Variable Interval Upon Zooming)

| Magnification | 0.417 | 0.795 | 1.179 |
|---|---|---|---|
| d2 | 10.3667 | 3.7836 | 1.4117 |
| d4 | 2.6202 | 6.2642 | 9.9750 |

(Condition Corresponding Values)

(1) $(R2 + R1)/(R2 - R1) = -0.564$
(2) $|f3|/fT = 0.453$

FIGS. 7A to 7E, 8A to 8E, and 9A to 9E are graphs showing various aberrations in the second embodiment. FIGS. 7A to 7E are graphs showing various aberrations in a low-magnification state, FIGS. 8A to 8E are graphs showing various aberrations in a middle-magnification state, and FIGS. 9A to 9E are graphs showing various aberrations in a high-magnification state.

In these graphs, h is the height of incidence, ω is the half field angle, C is the C-line (λ=656.3 nm), D is the d-line (λ=587.6 nm), and F is the F-line (λ=486.1 nm).

In each graph showing astigmatism, a solid curve represents the sagittal image plane, and a broken curve represents the meridional image plane. Furthermore, in each graph showing spherical aberration, a broken curve represents the sine condition.

As can be seen from these graphs, in this embodiment, various aberrations, especially, coma, are satisfactorily corrected over the respective focal length states from low magnification to high magnification.

As described above, according to the above embodiments, although the lens arrangement has a compact structure and a small lens moving amount, various aberrations, especially, coma, can be satisfactorily corrected.

In the above-mentioned embodiments, since relatively large spaces are assured before and after the field frame and the escaping space of the finder frame is large enough, the standard mode and the panoramic mode can be easily alternately switched by exchanging the field frame.

Furthermore, in the above embodiments, the field frame can be independently supported without depending on other optical members. Therefore, when the field frame comprises, e.g., a liquid crystal element, parallax correction or the like can be easily electrically attained.

As described above, the present invention can realize a compact real-image zoom finder which has a zoom ratio of x2.5 or higher, and can assure a wide observation field of view.

What is claimed is:

1. A real-image zoom finder comprising:
   an objective lens having a positive refractive power, said objective lens including, in order from the object side, a first lens unit having a negative refractive power, a second lens unit having a positive refractive power, a third lens unit having a negative refractive power, and a fourth lens unit having a positive refractive power, and said objective lens attaining zooming by moving at least said second lens unit along an optical axis; and
   an eyepiece lens which is used for observing a real image of an object formed by said objective lens and has a positive refractive power,
   wherein said objective lens satisfies the following condition:

$0.3 < |f3|/fT < 0.7$ where
   f3: the focal length of said third lens unit; and
   fT: the longest focal length of said objective lens,
   wherein said objective lens further satisfies the following condition:

$-0.6 < (R2+R1)/(R2-R1) < 0$ where
   R1: the radius of curvature of an object-side surface of a negative lens component closest to the object side in said third lens unit; and
   R2: the radius of curvature of an image-side surface of the negative lens component.

2. A finder according to claim 1, further comprising a reflection surface inserted in an optical path between said third and fourth lens units.

3. A finder according to claim 2, further comprising a second reflection surface disposed between said fourth lens unit and said eyepiece lens, wherein an optical axis deflected by said second reflection surface intersects a plane containing an optical axis deflected by the first-mentioned reflection surface.

4. A finder according to claim 3, further comprising a prism disposed between said fourth lens unit and said eyepiece lens, which has a third reflection surface.

5. A finder according to claim 2, further comprising a prism disposed between said fourth lens unit and said eyepiece lens, which has a second reflection surface.

6. A finder according to claim 5, wherein said prism is provided with a lens surface.

7. A finder according to claim 1, further comprising a device, inserted in an optical path between said third and fourth lens units, said device being part of a system for converting the real image into an erect image.

8. A finder according to claim 1, wherein said first lens unit includes an aspherical biconcave lens.

9. A finder according to claim 8, wherein said first lens unit consists of a single lens.

10. A finder according to claim 1, wherein said second lens unit includes an aspherical biconvex lens.

11. A finder according to claim 10, wherein said second lens unit consists of two lenses.

12. A finder according to claim 1, wherein said third lens unit includes an aspherical negative lens.

13. A finder according to claim 1, wherein said third lens Unit consists of a single lens.

14. A real-image zoom finder comprising:
   an objective lens having a positive refractive power, said objective lens including, in order from the object side, a first lens unit having a negative lens component, a second lens unit having a positive lens component, a third lens unit having a negative lens component and having a negative refractive power, and a fourth lens unit having a positive lens component, and said objective lens attaining zooming by moving at least said second lens unit along an optical axis; and an eyepiece lens having a positive refractive power, wherein said objective lens satisfies the following conditions:

$$0.3 < |f3|/fT < 0.7, \text{ and}$$

$$-0.6 < (R2+R1)/(R2-R1) < 0$$

where f3: the focal length of said third lens unit;

fT: the longest focal length of said objective lens;

R1: the radius of curvature of an object-side surface of the negative lens component closest to the object side in said third lens unit; and R2: the radius of curvature of an image-side surface of the negative lens component closest to the object side in said third lens unit.

15. A finder according to claim 14, wherein said negative lens component in said first lens unit includes an aspherical surface.

16. A finder according to claim 14, wherein said positive lens component in said second lens unit includes an aspherical surface.

17. A finder according to claim 14, wherein said first lens unit has a negative refractive power, and said second lens unit has a positive refractive power.

18. A finder according to claim 14, further comprising a reflection surface disposed between said third lens unit and said fourth lens unit, and three reflection surfaces disposed between said fourth lens unit and said eyepiece lens.

* * * * *